May 6, 1924.　　　　　F. W. MILLER　　　　　1,493,158
HEATING APPARATUS
Filed Feb. 19, 1921
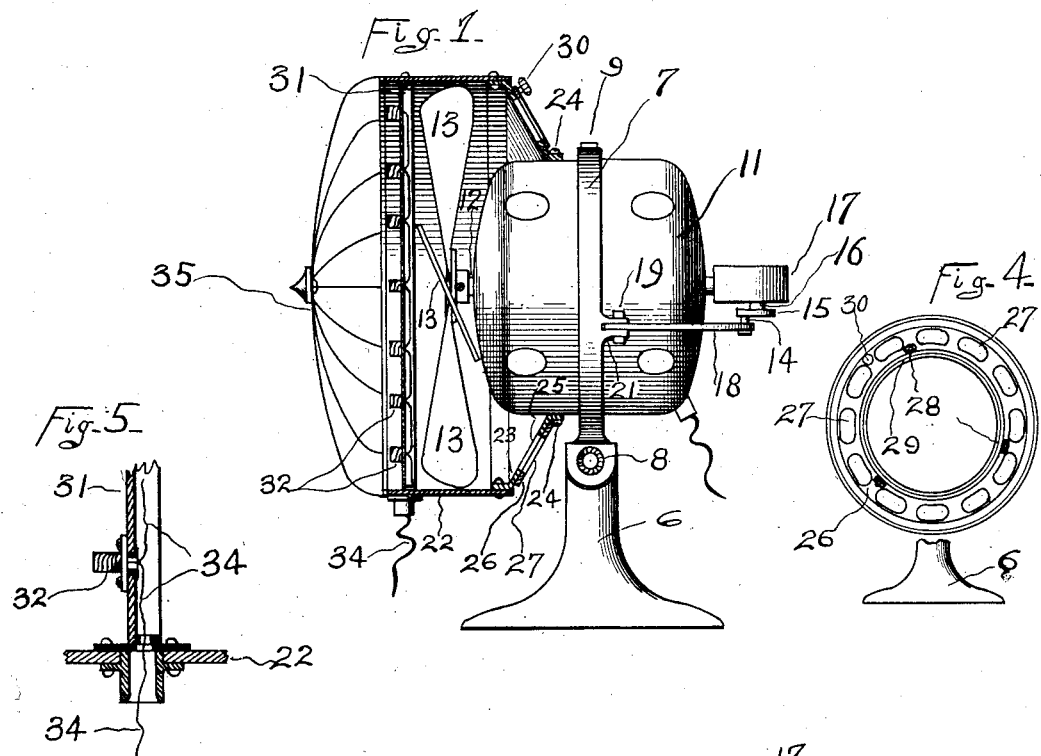
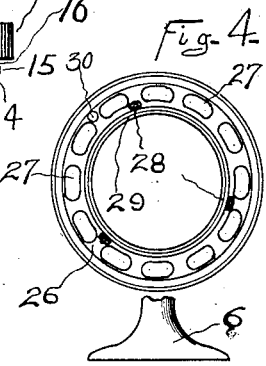
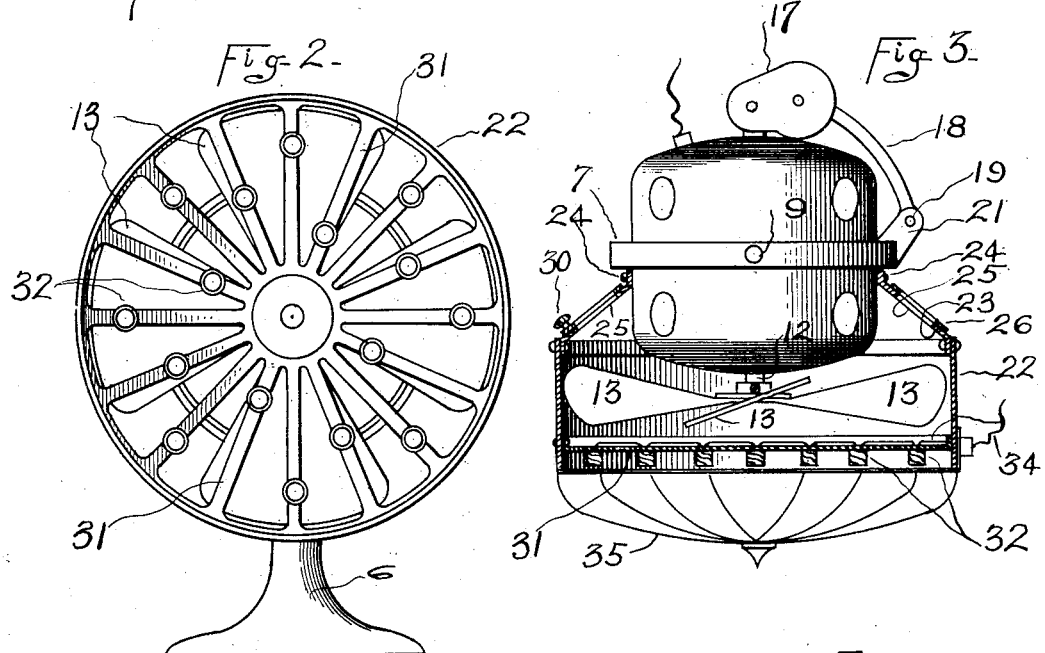
INVENTOR
Frank W. Miller
BY
Ira J. Wilson
ATTY.

Patented May 6, 1924.

1,493,158

UNITED STATES PATENT OFFICE.

FRANK W. MILLER, OF CHICAGO, ILLINOIS.

HEATING APPARATUS.

Application filed February 19, 1921. Serial No. 446,224.

*To all whom it may concern:*

Be it known that I, FRANK W. MILLER, a citizen of the United States, residing at Chicago, in the county of Cook and State of Illinois, have invented new and useful Improvements in Heating Apparatus, of which the following is a specification.

This invention relates in general to heating apparatus, and has more particular reference to small portable heating units adapted for use in homes, offices and other places where heat may be desired supplementary to the heating system with which the building is equipped.

I am aware that portable electric heating devices have heretofore been employed, but these devices customarily comprise one or more heating elements mounted within a heat radiating reflector, for the purpose of throwing the heat a limited distance outwardly from the device. The distance, however, that heat can thus be thrown by radiation is very limited, and my present invention has for its primary purpose, the provision of an apparatus by which the heat generated by a heating device may be thoroughly distributed throughout a considerable area by convection, rather than radiation.

With this end in view, my invention contemplates the employment of a fan, such for instance, as an ordinary household fan, with which a heating device is combined in such a way as to produce a unit which will deliver a current of air and simultaneously heat the same so that the heated air will be widely distributed and the heat will become more generally available than is possible with the ordinary heaters heretofore employed.

Other objects and many of the inherent advantages of this invention will be readily appreciated, as the same becomes better understood by reference to the following description, when considered in connection with the accompanying drawings.

Referring to the drawings:

Fig. 1 is a side elevation of an apparatus embodying my invention, certain parts being shown in section for purposes of clarity;

Fig. 2 is a front elevation of my apparatus with the wire guard removed;

Fig. 3 is a plan view partially in section of the apparatus disclosed in Fig. 1;

Fig. 4 is a fragmentary view looking from the rear, showing the air regulating device; and Fig. 5 is an enlarged fragmentary view of the heating device.

By reference to the drawings, it will be observed that my apparatus comprises a household fan consisting of a base 6, upon which a yoke 7 is pivotally mounted at 8 so that it may be tilted about a horizontal plane to direct the air upwardly or downwardly, as desired, and in this yoke upon central vertical pivots, the upper one of which is indicated by reference character 9, there is disposed a motor case 11, containing an electric motor of usual construction, the forward end of the shaft 12 of which carries the fan proper, comprising a plurality of blades 13. For the purpose of oscillating the fan about its vertically disposed pivots, to more thoroughly distribute the air, I have shown in the present instance, an oscillating mechanism comprising a crank pin 14 mounted on a disc 15 carried by a vertical shaft 16 disposed in a housing 17 at the rear of the motor casing, the upper end of this shaft 16 being connected with the rearwardly projecting motor shaft by beveled gears or other suitable connection, to impart a rotary movement to the crank pin 14. A link 18 connected at one end to the crank pin and at its opposite end by a pin 19 to ears 21 fixed to one side of the yoke 7 serves to impart an oscillatory movement to the fan as the crank pin is rotated by the motor. This mechanism is shown merely for purposes of illustration, as other means for producing the oscillatory movement may be employed within the purview of my invention.

Household fans are customarily equipped with a wire guard which surrounds the fan proper for the purposes of protection from the fan, and this guard is attached to the motor casing by a plurality of screws in most instances. My improved heating device is designed to replace the wire guard, and by removing the screws which hold the same, and taking the guard off, my heating device may be substituted therefor.

The heating device comprises a cylindrical supporting frame or housing 22 adapted to surround the fan blades, and the rear edge of this housing is equipped with an inwardly tapered member 23 adapted to fit around the motor casing and be screwed thereto by the screws 24, which customarily fasten the wire guard in position. The member 23 is preferably provided with a series of apertures 25, through which air may be drawn by the fan, and for purposes of regulating the quantity of air delivered by the fan, I mount upon the rear face of this member a slide or damper member 26 provided with similar perforations or openings 27 adapted to register with the openings 25. This member 26 may be secured to the member 23 by screws 28, each passing through an elongated slot 29, the slots being concentrically disposed to permit a limited sliding or rotary movement of the member 26, thus varying the effective area of the openings through which air may be drawn by the fan. For convenience, a knob 30 is mounted upon the member 26, which may be grasped to effect the adjusting movements of the member.

Within the housing and forwardly of the fan, is mounted a heating device which, while it may be in the form of a grill or fretwork of wire, if preferred, is shown in the present instance as consisting of a plurality of radially disposed ribs or spokes 31, preferably of channel shape, and each carrying one or more hot points consisting of a coil of wire 32 adapted to generate heat when an electric current is passed therethrough. These hot points may be arranged in any preferred manner, but preferably, for purposes of efficiency, they are distributed at varying radial distances from the center of the support. It will be apparent from Fig. 5 that the rear face of each supporting member 31 is substantially channel-shaped to accommodate and protect the wires 34 which supply the current to the hot points.

For purposes of protection, I prefer to mount forwardly of the heating device a wire guard 35 of any preferred construction, which will prevent any one from accidentally coming in contact with the heating device. Suitable switches are employed in the lines running to the motor and to the heating device, and it will be obvious that the fan may be used in the ordinary manner for cooling and ventilating purposes when the heating device is not turned on.

It will be apparent from the foregoing that I have provided a heating apparatus which not only heats the air, but thoroughly distributes the heated air throughout a room, thus producing a high degree of efficiency. The apparatus may be manufactured as a unit, or the heating device may be constructed and sold for application to fans already in use, and in either event, the combined action of the heating device and the fan result in an efficient and a thorough distribution of the heat not possible of attainment with a radiant heater.

It is believed that my invention and many of its advantages will be appreciated from the foregoing without further description, and while I have shown and described a preferred embodiment of the invention, it may obviously be varied in many details without departing from the spirit of the invention, as defined in the following claims.

I claim:

1. A heating apparatus, comprising a cylindrical housing adapted to surround a fan and a heating device disposed within said housing comprising a plurality of radially disposed ribs, heating elements carried by said ribs, and deflectors for deflecting air from said heating elements.

2. In a heating apparatus, the combination of a base, a fan mounted to oscillate thereon, a shell surrounding said fan, an electric heating device mounted within said shell in front of the fan, and means for oscillating said fan and heating device as a unit relatively to said base.

FRANK W. MILLER.